US008847897B2

(12) United States Patent
Sakai et al.

(10) Patent No.: US 8,847,897 B2
(45) Date of Patent: Sep. 30, 2014

(54) TOUCH-OPERATING INPUT DEVICE AND ELECTRONIC DEVICE EQUIPPED WITH THE SAME

(75) Inventors: Naohiro Sakai, Saitama (JP); Yoshitaka Noguchi, Saitama (JP); Shigeharu Nezu, Saitama (JP)

(73) Assignee: Toyo Denso Kabushiki Kaisha, Tokyo (JP)

( * ) Notice: Subject to any disclaimer, the term of this patent is extended or adjusted under 35 U.S.C. 154(b) by 633 days.

(21) Appl. No.: 13/202,039

(22) PCT Filed: Feb. 22, 2010

(86) PCT No.: PCT/JP2010/052592

§ 371 (c)(1), (2), (4) Date: Aug. 17, 2011

(87) PCT Pub. No.: WO2010/095733

PCT Pub. Date: Aug. 26, 2010

(65) Prior Publication Data

US 2011/0298741 A1 Dec. 8, 2011

(30) Foreign Application Priority Data

Feb. 23, 2009 (JP) ................................. 2009-039708

(51) Int. Cl.
*G01K 1/06* (2006.01)
*H01H 13/83* (2006.01)

(52) U.S. Cl.
CPC .................................... *H01H 13/83* (2013.01)
USPC ..................... 345/173; 362/23.02; 362/23.03; 362/23.04; 362/23.05; 362/23.06; 362/23.07; 362/23.08; 362/23.09; 362/23.1; 362/23.11; 362/23.12; 362/23.13; 362/23.16; 362/23.17; 362/23.18; 362/23.19; 362/601; 362/602; 362/603; 362/604; 340/815.49; 340/815.5; 340/815.53; 340/815.54; 340/815.55; 116/200; 116/202; 116/205; 116/248; 116/249; 116/250; 116/251; 116/252; 116/253; 116/255; 116/3; 116/4; 116/28.1; 116/29; 116/26.4; 116/279; 116/284; 116/285; 116/286; 116/298; 200/300; 200/19.14; 200/600; 200/341

(58) Field of Classification Search
USPC ........ 340/815.49–815.55; 116/200, 202, 205, 116/248–253, 255, 3, 4, 28.1, 29, 62.4, 279, 116/284–286, 298, 300; 200/19.14, 600, 200/341; 362/23.02–23.2, 601–605
See application file for complete search history.

(56) References Cited

U.S. PATENT DOCUMENTS

| | | | | |
|---|---|---|---|---|
| 4,262,182 | A * | 4/1981 | Basler et al. | 200/314 |
| 5,747,756 | A * | 5/1998 | Boedecker | 200/5 A |

(Continued)

FOREIGN PATENT DOCUMENTS

| | | | |
|---|---|---|---|
| JP | 1993-128828 | A | 5/1993 |
| JP | 2006-146701 | A | 6/2006 |
| JP | 2007-18811 | A | 1/2007 |
| JP | 2007-149610 | A | 6/2007 |
| JP | 2008-269574 | A | 11/2008 |

*Primary Examiner* — Alexander S Beck
*Assistant Examiner* — Amen Bogale
(74) *Attorney, Agent, or Firm* — Bruzga & Associates; Charles E. Bruzga; Jay S. Pattumudi

(57) ABSTRACT

The touch-operating input device is configured so that when the control circuit turns on the main light source corresponding to each of the translucent operation buttons that can be operated, the control circuit, on condition that the translucent operation button corresponding to the main light source that is turned on is operated, turns off the sub-light source corresponding to the translucent operation button that is turned on simultaneously with the main light source. Ease of operation is increased by enabling the operator to distinguish operated translucent operation buttons from translucent operation buttons that have not been operated according to whether or not the main light sources are lit.

19 Claims, 11 Drawing Sheets

(56) References Cited

U.S. PATENT DOCUMENTS

| | | | | |
|---|---|---|---|---|
| 7,430,355 | B2 * | 9/2008 | Heikenfeld et al. | 385/129 |
| 7,942,538 | B2 * | 5/2011 | Kleverman et al. | 362/24 |
| 7,959,340 | B2 * | 6/2011 | Kofidis et al. | 362/603 |
| 8,294,659 | B2 * | 10/2012 | Rosenblatt | 345/102 |
| 2003/0107497 | A1 * | 6/2003 | Krenz et al. | 340/815.4 |
| 2008/0205032 | A1 * | 8/2008 | Liu | 362/24 |
| 2010/0137033 | A1 * | 6/2010 | Lee | 455/566 |

* cited by examiner

TOUCH-OPERATING INPUT DEVICE AND ELECTRONIC DEVICE EQUIPPED WITH THE SAME

CROSS REFERENCE TO RELATED APPLICATIONS

This application is a United States Application under 35 U.S.C. 371 claiming benefit of PCT Application No. PCT/JP2010/052592, filed on Feb. 22, 2010, which claims the benefit of Japanese Patent Application No. 2009-039708, filed on Feb. 23, 2009, the contents of each of which are incorporated herein by reference.

FIELD OF THE INVENTION

The field relates to a touch-operating input device and an electronic device equipped with said touch-operating input device.

BACKGROUND

In recent years, a touch-operating input device utilizing display means such as a liquid crystal display panel has been in practical use as an operation input portion of an electronic device. In the touch-operating input device, button input operation is performed by performing touch operation on an operation button displayed on a screen of a touch panel. Detection of whether the operation button is touched and operated is performed by a function of a touch sensor that is provided to correspond to the operation button. In this respect, there is provided a touch-operating input device configured to display by illuminating an operation button that can be operated from among a plurality of operation buttons such that an operator can easily find the operation button that can be operated such those disclosed in paragraph [0037] of Japanese Patent Application Laid-Open No. 2006-146701, for example.

However, merely displaying the operation button that can be operated sometimes makes it difficult to find an operation button that cannot be operated at this moment but is to be operated subsequently. For example, a case in which an in-vehicle air conditioner, audiovisual device, and car navigation device are operated by touching a button on an identical touch-input device, is taken as an example. In the case where only an operation button that can be operated is displayed, if the audiovisual device is operated after operation of the air conditioner, the operation button of the audiovisual device, which is not displayed, may not be immediately found because it is not to be operated. This happens because the operation button for the audiovisual device is either not displayed or displayed but is in a state difficult to find even though the operation button for the air conditioner is displayed.

To make it easy to find an operation button that is either not displayed or displayed but is in a state difficult to find, it is preferable to illuminate and display, at the same time if possible, such an operation button that will be probably operated. However, if such an operation button is also illuminated and displayed at the same time, it may be difficult to find which one of the operation buttons the operator has operated or which one of the operation buttons is the one that can be operated. To state it differently, such an arrangement may cause poor operability of the touch-operating input device.

SUMMARY OF THE INVENTION

The present invention has been made in view of the foregoing circumstances, and it is an object of the present invention to enhance operability of a touch-operating input device and an electronic device provided with the same. Detailed configurations will be described in different sections. However, it should be noted that the definition of terms to be provided in describing the invention set forth in any of the claims should also be applied, within an applicable scope, to the inventions set forth in other claims regardless of the sequence of the descriptions and other matters.

Means for Solving the Problem (Features of the Invention Set Forth in Claim 1)

A touch-operating input device according to the invention set forth in claim 1 (hereinafter, referred to as "input device of claim 1" arbitrarily) is configured of an operation panel including a touch surface and a rear surface opposite to the touch surface; a plurality of translucent touch sensors disposed on the rear surface of the operation panel; a plurality of sub-light sources disposed in a position facing the operation panel with the plurality of translucent touch sensors interposed therebetween; a light-shielding panel disposed in a position opposite to the plurality of translucent touch sensors with respect to the plurality of sub-light sources; a plurality of main light sources disposed in a predetermined position facing the plurality of sub-light sources with the light-shielding panel interposed therebetween; and a control circuit configured to perform control of lighting and extinguishing the sub-light sources and the main light sources. A plurality of translucent operation buttons individually corresponding to the plurality of translucent touch sensors, and translucent outer portions formed individually in outer portions of the plurality of translucent operation buttons are formed on the rear surface of the operation panel by concealed printing such that the operation buttons and the translucent outer portions are illuminated and displayed only when the light sources are lit, and the light-shielding panel is provided with a plurality of non-light-shielding regions individually corresponding to the plurality of translucent touch sensors. Here, light of each of the plurality of main light sources that are lit is configured to pass through the non-light-shielding region and the translucent touch sensor so that only the translucent operation button corresponding to each of the plurality of main light sources is illuminated and displayed, and light of each of the plurality of sub-light sources that are lit is configured to pass through the translucent touch sensor so that only the translucent outer portion corresponding to each of the plurality of sub-light sources is illuminated and displayed. Further, when the control circuit turns on the main light source corresponding to each of the translucent operation buttons that can be operated, the control circuit, on condition that the translucent operation button corresponding to the main light source that is turned on is operated, turns on the sub-light source corresponding to the translucent operation button that is operated.

According to the input device of claim 1, when the main light sources relating to the translucent operation buttons that can be operated are lit, light of the main light sources passes through the non-light-shielding regions and the translucent touch sensors, and illuminates and displays only corresponding translucent operation buttons. The translucent operation buttons that cannot be operated are not illuminated and displayed. Accordingly, an operator can securely distinguish the translucent operation buttons that can be used and the translucent operation buttons that cannot be used from each other. Lighting and extinguishing the main light sources are controlled by the control circuit. Here, any of the translucent operation buttons that are illuminated and displayed is operated (touched) by the operator, the touch is detected by the translucent touch sensor. Upon receiving this detection, the control circuit turns on the sub-light source corresponding to the translucent operation button that is touched. The light of the sub-light source passes through the translucent touch sensor, and illuminates and displays the corresponding translucent outer portion. The translucent outer portions of translucent operation buttons, which are illuminated because they can be operated but are not yet touched, are not illuminated and displayed. In this way, it is possible to find the translucent operation button that has been touched earlier depending on whether the translucent outer portion thereof is illuminated or not illuminated.

(Features of the Invention Set Forth in Claim 2)

A touch-operating input device according to the invention set forth in claim 2 (hereinafter, referred to as "input device of claim 2" arbitrarily) is configured of an operation panel including a touch surface and a rear surface opposite to the touch surface; a plurality of translucent touch sensors disposed on the rear surface of the operation panel; a plurality of sub-light sources disposed in a position facing the operation panel with the plurality of translucent touch sensors interposed therebetween; a light-shielding panel disposed in a position opposite to the plurality of translucent touch sensors with respect to the plurality of sub-light sources; a plurality of main light sources disposed in a predetermined position facing the plurality of sub-light sources with the light-shielding panel interposed therebetween; and a control circuit configured to perform control of lighting and extinguishing the sub-light sources and the main light sources. A plurality of translucent operation buttons individually corresponding to the plurality of translucent touch sensors and translucent outer portions formed individually in outer portions of the plurality of translucent operation buttons are formed on the rear surface of the operation panel by concealed printing such that the operation buttons and the translucent outer portions are illuminated and displayed only when the light sources are lit, and the light-shielding panel is provided with a plurality of non-light-shielding regions individually corresponding to the plurality of translucent touch sensors. Here, light of each of the plurality of main light sources that are lit is configured to pass through the non-light-shielding region and the translucent touch sensor so that only the translucent operation button corresponding to each of the plurality of main light sources is illuminated and displayed, and light of each of the plurality of sub-light sources that are lit is configured to pass through the translucent touch sensor so that only the translucent outer portion corresponding to each of the plurality of sub-light sources is illuminated and displayed. Further, when the control circuit turns on the main light source corresponding to each of the translucent operation buttons that can be operated, the control circuit, on condition that the translucent operation button corresponding to the main light source that is turned on is operated, turns off the sub-light source corresponding to the translucent operation button that is turned on simultaneously with the main light source.

According to the input device of claim 2, when the main light sources relating to the translucent operation buttons that can be operated are lit, light of the main light sources passes through the non-light-shielding regions and the translucent touch sensors, and illuminates and displays only corresponding translucent operation buttons. Simultaneously with lighting of the main light source, the sub-light source corresponding thereto is also lit. Accordingly, the light of the sub-light source passes through the translucent touch sensor, and the translucent outer portion is also illuminated and displayed. The translucent operation buttons that cannot be operated and the translucent outer portions thereof are not illuminated and displayed. Accordingly, an operator can securely distinguish the translucent operation buttons that can be used and the translucent operation buttons that cannot be used from each other. Lighting and extinguishing the main light sources and lighting and extinguishing the sub-light sources are performed by the control circuit and controlled by the control circuit. Here, any of the translucent operation buttons that are illuminated and displayed is operated (touched) by the operator, the touch is detected by the translucent touch sensor. Upon receiving this detection, the control circuit turns off the sub-light source corresponding to the translucent operation button that is touched. The translucent outer portions of translucent operation buttons, which are illuminated because they can be operated but are not yet touched, remain illuminated and displayed. In this way, it is possible to find the translucent operation button that has been touched earlier depending on whether the translucent outer portion thereof is illuminated or not illuminated.

(Features of the Invention Set Forth in Claim 3)

The touch-operating input device according to the invention set forth in claim 3 (hereinafter, referred to as "input device of claim 3" arbitrarily) is based on the input device of claim 1, the light-shielding panel is provided with light-shielding ribs having a cylindrical shape and formed upright on individual peripheries of the non-light-shielding regions, and the main light source is disposed inside the cylindrical shape of each of the light-shielding ribs.

According to the input device of claim 3, in addition to the working effect provided by the input device of claim 1, light of the main light source does not leak sideways by being prevented by the light-shielding ribs having a cylindrical shape. For this reason, an area between the translucent operation buttons is not unnecessarily illuminated and displayed. Therefore, the translucent operation button is illuminated and displayed in a manner in which the outline thereof is clearly displayed. In addition, since unnecessary portion is not illuminated and displayed, there is no chance of incorrect operation.

(Features of the Invention Set Forth in Claim 4)

The touch-operating input device according to the invention set forth in claim 4 (hereinafter, referred to as "input device of claim 4" arbitrarily) is based on the input device of claim 1 or 3, brightness of the plurality of translucent operation buttons and brightness of the translucent outer portions individually corresponding thereto are different from each other.

According to the input device of claim 4, in addition to the working effect provided by the input device of claim 1 or 3, it is possible to easily recognize whether the translucent outer portion is illuminated and displayed or not by a difference in brightness. Specifically, if the brightness of the translucent operation button is made different from that of the translucent outer portion rather than making them the same, it becomes easy to distinguish the difference because there is a difference between the two.

(Features of the Invention Set Forth in Claim 5)

The touch-operating input device according to the invention set forth in claim 5 (hereinafter, referred to as "input device of claim 5" arbitrarily) is based on the input device of any one of claims 1, 3, and 4, the translucent operation buttons are configured of a plurality of main operation buttons, and a plurality of sub-operation buttons that are provided in a manner to corresponding to individual functions of the plurality of main operation buttons.

According to the input device of claim 5, in addition to the working effect provided by the input device of any one of claims 1, 3, and 4, by separating the main operation buttons and the sub-operation buttons from each other, it is possible to perform step-like operation. This makes it possible to enhance the operability.

(Features of the Invention Set Forth in Claim 6)

The touch-operating input device according to the invention set forth in claim 6 (hereinafter, referred to as "input device of claim 6" arbitrarily) is based on the input device of claim 5, each of the plurality of sub-operation buttons has a display area smaller than a display area of each of the plurality of main operation buttons corresponding thereto.

According to the input device of claim 6, in addition to the working effect provided by the input device of claim 5, since the main operation button having a larger display area is more visible than the sub-operation button having a smaller display area, it is possible to easily distinguish what is subjected to the main operation during the step-like operation.

(Features of the Invention Set Forth in Claim 7)

The touch-operating input device according to the invention set forth in claim 7 (hereinafter, referred to as "input device of claim 7" arbitrarily) is based on the input device of claim 5 or 6, the main light sources are configured by including LEDs, and the sub-light sources are configured by including ELs or organic ELs.

According to the input device of claim 7, in addition to the working effect provided by the input device of claim 5 or 6, it is possible to realize miniaturization and a reduction in power consumption. In particular, use of the EL or the organic EL makes it possible to make the sub-light source a light and thin.

(Features of the Invention Set Forth in Claim 8)

The touch-operating input device according to the invention set forth in claim 8 (hereinafter, referred to as "input device of claim 8" arbitrarily) is based on the input device of any one of claims 5 to 7, the main light sources are configured to illuminate and display the plurality of main operation buttons in colors different from one another.

According to the input device of claim 8, in addition to the working effect provided by the input device of any one of claims 5 to 7, since the main operation buttons are illuminated and displayed in colors different from one another, it is possible to distinguish the main operation buttons from one another more easily.

(Features of the Invention Set Forth in Claim 9)

The touch-operating input device according to the invention set forth in claim 9 (hereinafter, referred to as "input device of claim 9" arbitrarily) is based on the input device of claim 8, the sub-light sources are configured to illuminate and display the sub-operation buttons in colors individually similar to the colors in which corresponding main operation buttons are illuminated and displayed.

According to the input device of claim 9, in addition to the working effect provided by the input device of claim 8, since the main operation button and the sub-operation buttons corresponding thereto are illuminated and displayed in similar colors, it is possible to distinguish the correspondence relationship therebetween more easily. As a result, the operability can be improved.

(Features of the Invention Set Forth in Claim 10)

The touch-operating input device according to the invention set forth in claim 10 (hereinafter, referred to as "input device of claim 10" arbitrarily) is based on the input device of any one of claims 5 to 7, while the main light sources relating to the plurality of main operation buttons are all turned off, the control circuit turns on all of the main light sources on condition that any of the main operation buttons is operated, at the same time, the control circuit turns on all of the main light sources that relate to the sub-operation buttons corresponding to the main operation button that has been operated earlier after all of the main light sources are turned on, and, when another main operation button other than that operated earlier is operated later, the control circuit turns on all of the main light sources relating to the sub-operation buttons that relate to the later operation and turns off all the sub-light sources relating to the sub-operation buttons that relate to the earlier operation.

According to the input device of claim 10, in addition to the working effect provided by the input device of any one of claims 5 to 7, when any of the main operation buttons is operated while all of the main operation buttons are not illuminated and displayed, all of the main operation buttons are illuminated and displayed. All of the sub-operation buttons corresponding to the main operation button that is operated among all of the main operation buttons that are illuminated and displayed are illuminated and displayed. Here, when the operation button other than those that have been operated earlier is operated (later operation), all of the sub-operation buttons relating to the main operation button that has been operated earlier cease to be illuminated and displayed, and all of the sub-operation buttons relating to the main operation button that is operated later are illuminated and displayed.

(Features of the Invention Set Forth in Claim 11)

The touch-operating input device according to the invention set forth in claim 11 (hereinafter, referred to as "input device of claim 11" arbitrarily) is based on the input device of claim 10, the control circuit is configured to stop illuminating and displaying the sub-operation buttons and the main operation buttons that are all illuminated and displayed on condition that the main operation button relating to the sub-operation button which has been illuminated and displayed is operated again.

According to the input device of claim 11, based on the input device of claim 10, when the main operation button (the sub-operation buttons corresponding to the main operation buttons other than this are not illuminated and displayed) corresponding to the sub-operation button that is illuminated and displayed is operated again, all of the main operation buttons and the sub-operation buttons cease to be illuminated and displayed. As a result, all of the operation buttons are turned into a state of unilluminated and nondisplayed, and the surface of the touch panel becomes neat. Unnecessary illumination and display are excluded, which makes the design of the surface of the touch panel neat and clean.

(Features of the Invention Set Forth in Claim 12)

The touch-operating input device according to the invention set forth in claim 12 (hereinafter, referred to as "input device of claim 12" arbitrarily) is based on the input device of claim 10 or 11, the main light sources are configured to illuminate and display the plurality of main operation buttons individually in colors different from one another.

According to the input device of claim 12, in addition to the working effect provided by the input device of claim 10 or 11, since the main operation buttons are illuminated and displayed in colors different from one another, it is possible to distinguish the main operations buttons more easily from one another.

(Features of the Invention Set Forth in Claim 13)

The touch-operating input device according to the invention set forth in claim 13 (hereinafter, referred to as "input device of claim 13" arbitrarily) is based on the input device of claim 12, the sub-light sources are configured to illuminate and display the sub-operation buttons individually in colors similar to those of the main operation buttons corresponding thereto.

According to the input device of claim 13, in addition to the working effect provided by the input device of claim 12, since the main operation button and the sub-operation buttons corresponding thereto are illuminated and displayed in similar colors, it is possible to distinguish the correspondence relationship therebetween more easily. As a result, the operability can be improved.

(Features of the Invention Set Forth in Claim 14)

The touch-operating input device according to the invention set forth in claim 14 (hereinafter, referred to as "input device of claim 14" arbitrarily) is based on the input device of any one of claims 5 to 13, the operation panel is provided, on the touch surface thereof, with one or both of an operation lever and an operation dial that serve functions supplementing or substituting functions of the main operation buttons or the sub-operation buttons.

According to the input device of claim 14, in addition to the working effect provided by the input device of any one of claims 5 to 14, since one or both of the operation lever and the operation dial are provided, the functions of the main operation buttons or the sub-operation buttons are supplemented or substituted. With this supplemented function, further detailed or highly sophisticated input operation is made possible, and, with this substituted function, input operation substituting for that by the operation buttons is made possible.

(Features of the Invention Set Forth in Claim 15)

The touch-operating input device according to the invention set forth in claim 15 (hereinafter, referred to as "input device of claim 15" arbitrarily) is based on the input device of any one of claims 5 to 14, one or both of a vibration means and a notification means are provided so that, when any of the main operation buttons or the sub-operation buttons is operated by touch of a finger, the vibration means applies vibration to the finger, or the notification means generates a touch sound.

According to the input device of claim 15, in addition to the working effect provided by the input device of any one of claims 5 to 14, since one or both of the vibration means and the notification means that generates a touch sound are provided, confirmation of the touch operation can be performed in a tactile or acoustic manner or in a tactile and acoustic manner in addition to the visual manner.

(Features of the Invention Set Forth in Claim 16)

The touch-operating input device according to the invention set forth in claim 16 (hereinafter, referred to as "input device of claim 16" arbitrarily) is based on the input device of claim 15, a vibration frequency of the vibration means or a frequency of the touch sound of the notification means is set differently for each of the operation buttons.

According to the input device of claim 16, in addition to the working effect provided by the input device of claim 15, it is possible to distinguish the operation button that is operated from others more easily based on a difference in the vibration frequency or the frequency of the sound.

(Features of the Invention Set Forth in Claim 17)

The touch-operating input device according to the invention set forth in claim 17 (hereinafter, referred to as "input device of claim 17" arbitrarily) is based on the input device of claim 13, the touch-operating input device is configured as an in-vehicle type and the main operation button is configured to selectively operate in-vehicle apparatuses including an air conditioner, an audiovisual device, and a car navigation device.

According to the input device of claim 17, the working effect provided by the input device of claim 13 can be selectively operated on in-vehicle apparatuses including air conditioner, audiovisual device, and car navigation device.

(Features of the Invention Set Forth in Claim 18)

The electronic device according to the invention set forth in claim 18 (hereinafter, referred to as "electronic device of claim 18" arbitrarily) is provided with the touch-operating input device recited in any one of claims 1 to 13.

According to the electronic device of claim 18, the working effect of the input device of any one of claims 1 to 13 can be provided.

Effects of the Invention

According to the present invention, since it is possible to arrange an operation button to be found more easily, which is either not displayed or displayed but in a state difficult to find, operability of a touch-operating input device and an electronic device equipped with the same can be improved.

DETAILED DESCRIPTION

The examples and drawings provided in the detailed description are merely examples, which should not be used to limit the scope of the claims in any claim construction or interpretation.

Best Mode for Carrying Out the Invention

Hereinafter, the best modes for carrying out the present invention (hereinafter, arbitrarily referred to as "present embodiment") are described with reference to the drawings. The present embodiment relates to an in-vehicle touch-operating input device which is one aspect of an electronic device.

(Schematic Structure of a Touch-Operating Input Device)

(External Structure)

Figure 5:
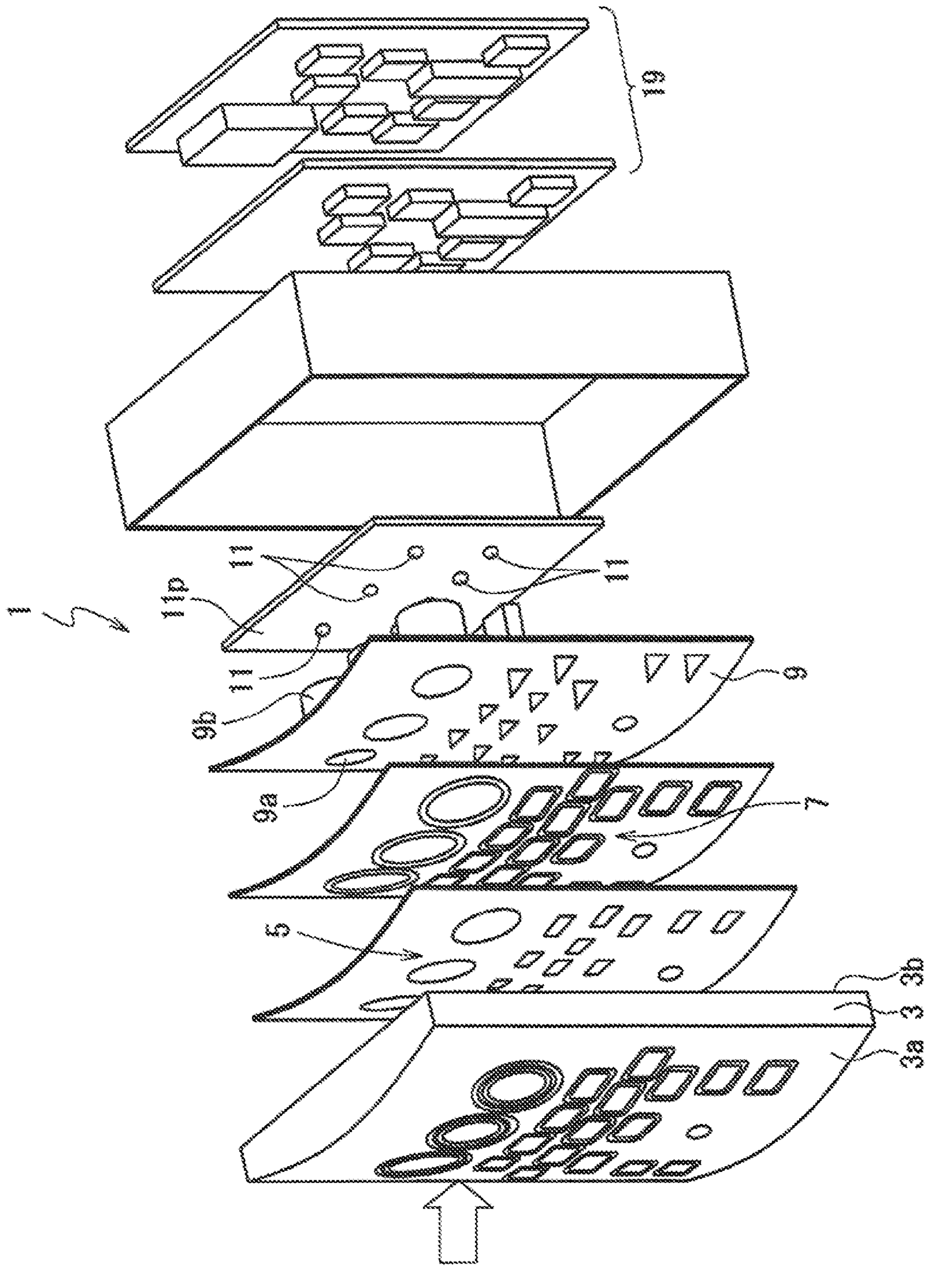
FIG. 5 is an exploded perspective view of the touch-operating input device.

As illustrated in FIGS. 1 to 5, and particularly with reference to FIG. 5, for example a touch-operating input device 1 (hereinafter, referred to as "input device 1") is mainly configured by including, in a direction away from an operator, an operation panel 3, a plurality of translucent touch sensors 5 (hereinafter, referred to as "touch sensors 5"), as many sub-light sources 7 as the touch sensors 5, a light-shielding panel 9, and as many main light sources 11 as the touch sensors 5. Further, an operation lever 13 (shown in FIGS. 1-3, for example) and an operation dial 15 (shown in FIGS. 1-3, for example) are provided externally, and vibration actuators 17 (shown in FIG. 4, for example) as vibration means are provided internally. Reference numeral 19 (shown in FIG. 5, for example, represents a circuit board.

(Operation Panel)

The operation panel 3 is structured of a synthetic resin plate (for example, polycarbonate) having a thin rectangular shape in a base color of black, and is provided with a touch surface 3*a* which can be touched by a finger of the operator and a rear surface 3*b* provided on a side (rear side) opposite to the touch surface 3*a* (see FIG. 5). Other materials for an operation panel may be used. A plurality of translucent operation buttons and a plurality of translucent outer portions individually formed in outer areas of the plurality of translucent operation buttons are printed by concealed printing on the rear surface 3*b* of the operation panel 3. In the examples shown in FIGS. 1, 2, 3, 7, 8, and 9, for example, the translucent operation buttons are configured as a set of three main operation buttons 31, 33 and 35 with outer portions 31', 33' and 35' for each of them respectively. Any number of buttons and outer portions that can be realized by a person of ordinary skill is contemplated within the scope of this disclosure. The concealed printing is a type of printing in which, when light is emitted from a side of the rear surface 3*b*, a printed image is illuminated and displayed visibly on a side of the touch surface 3*a*; and, when light is not emitted, the printed image is either not visible or visible but hard to be noticed. Each of the translucent operation buttons and each of the translucent outer portions are translucent so that they are displayed by illumination.

To be specific, each of the translucent operation buttons and each of the translucent outer portions are displayed by illumination because of translucent properties thereof only when the corresponding main light source 11 and sub-light source 7 are lit, but are either not visible or visible but hardly noticeable when they are not lit.

(Touch Sensor)

The touch sensors 5 individually corresponding to the translucent operation buttons and the translucent outer portions are arranged on a side of the rear surface 3*b* of the operation panel 3. The touch sensors 5 are individually provided with touch electrodes that are formed by printing a semitransparent conductive paste on a transparent rectangular film having almost the same size as the operation panel 3. The touch electrodes are disposed to individually oppose each other so that a change in the capacitance between two electrodes when a finger of the operator touches the touch surface 3*b* of the operation panel 3 can be detected.

(Main Light Source and Sub-Light Source)

For the sake of explanation, the sub-light sources 7 will be described first. The sub-light sources 7 are formed of EL (or organic EL) disposed in a position facing the operation panel 3 with the touch sensors 5 interposed therebetween. The sub-light sources 7 are configured such that, when a control circuit 41 (see FIG. 6 that will be described later) of the circuit board 19 illustrated in FIG. 5 turns on the main light sources 11 each corresponding to the translucent operation buttons that can be operated, the control circuit 41 turns on the sub-light source 7 that corresponds to the translucent operation button on condition that the translucent operation button corresponding to the main light source 11 that is lit is operated. This will be explained again.

The main light source 11 is formed of an LED and is disposed on a side of the light-shielding panel 9 opposite to the touch sensor 5 viewed from the sub-light source 7 so that the main light source 11 faces the touch sensor 5. The light-shielding panel 9 is formed by coating light-shielding paint on a rear surface of a translucent synthetic resin panel by leaving a plurality of non-light-shielding regions 9*a* (see FIG. 5) uncoated. The light-shielding paint is to prevent light of the LED from passing through in a thickness direction of the panel, and the non-light-shielding regions 9*a* function as windows allowing the light to pass therethrough in the thickness direction.

Light-shielding ribs 9*b* having a cylindrical shape are formed upright on individual peripheries of the non-light-shielding regions 9*a* on the reverse surface of the light-shielding panel 9. Each of the light-shielding ribs 9*b* is formed integrally with the light-shielding panel 9. When the light-shielding paint is coated integrally on an outer circumference of each of the light-shielding ribs 9*b*, the formation thereof becomes easier.

A light guide filter is placed in an area enclosed by each of the light-shielding ribs 9*b* having a cylindrical shape to make light of the LED as the main light source 11 uniform for the non-light-shielding region 9*a*. The light of the LED does not leak sideways by virtue of a function of the light-shielding ribs 9*b* having a cylindrical shape. Each of the LEDs is fixed to a circuit board 11*p*, and the circuit board 11*p* also serves to shield the light coming from behind to the light-shielding ribs 9*b*.

(Operation Button)

In the present embodiment, the translucent operation buttons are configured of a plurality (three in the present embodiment) of main operation buttons 31, 33, and 35, and a plurality (five or six in the present embodiment) of sub-operation buttons 31*a* to 31*f*, 33*a* to 33*e*, and 35*a* to 35*e* provided in a manner to correspond to individual functions of the main operation buttons 31, 33, and 35. The reason why the main operation buttons and the sub-operation buttons are separated from each other is to enable step-like operation by main operation and sub-operation to thereby enhance the operability. The main operation buttons 31, 33, and 35 are arranged to perform selection of the air conditioner, the audiovisual device, and the car navigation device, distinguished by being illuminated and displayed, for example, in green, orange, and blue, respectively, and formed in a circular shape having, for example, a radius of about 25 mm. The reason why they are separated by colors is that the functions that which can be operated can be distinguished by colors. The sub-operation buttons 31*a* to 31*f*, 33*a* to 33*e*, and 35*a* to 35*e* are distinguished by being illuminated and displayed by colors similar to those of individually corresponding main operation buttons, that is, green, orange, and blue, for example.

Although it is not purposed to limit the colors, the reason why the similar colors are chosen is to make it easier to find the correspondence between the main operation and sub-operation. All areas of the sub-operation buttons are identical, but are smaller than those of the main operation buttons and formed in a rectangular shape having, for example, about 20 mm in width and about 10 mm in height.

Figure 1:
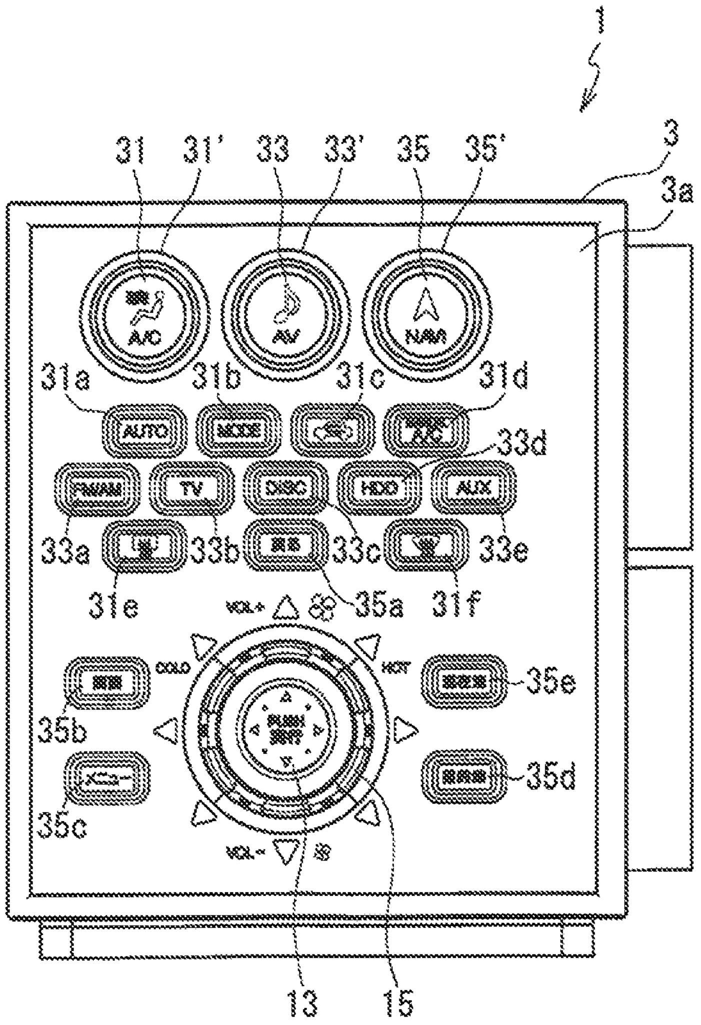
FIG. 1 is a front view of a touch-operating input device.
Figure 2:
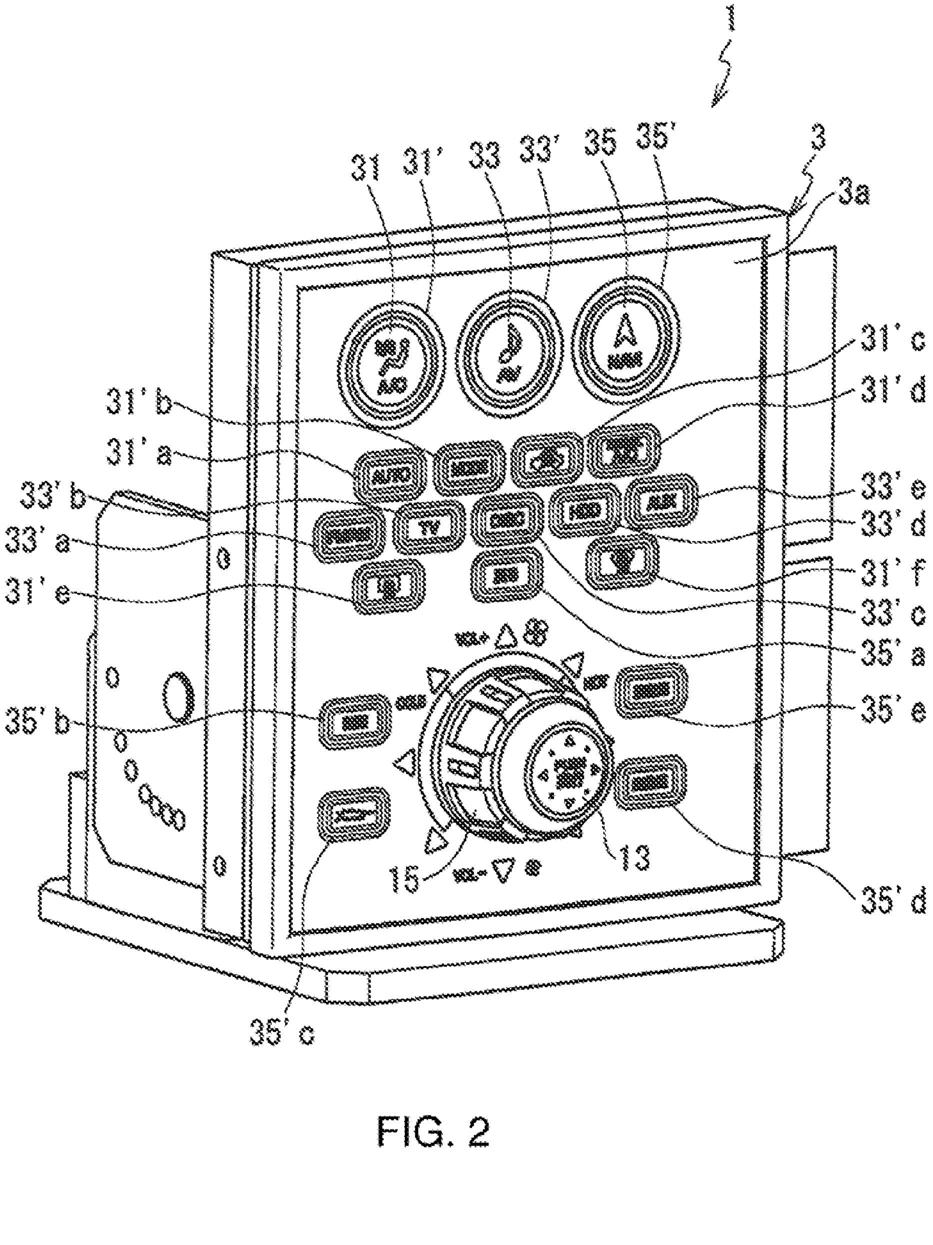
FIG. 2 is a perspective view of the touch-operating input device.

The translucent outer portions 31', 33', and 35' surround, in a ring shape, the main operation buttons 31, 33, and 35, respectively, and are also formed of translucent outer portions 31'*a* to 31'*f*, 33'*a* to 33'*e*, and 35'*a* to 35'*e* that surround, in a ring shape, the sub-operation buttons 31*a* to 31*f*, 33*a* to 33*e*, and 35*a* to 35*e*, respectively (individual reference numerals for the main operation buttons are indicated in FIG. 1, and individual reference numerals for the sub-operation buttons are indicated in FIG. 2 in a separated manner for easy visibility). The foregoing sub-operation buttons are arranged to have colors similar to those of the individually corresponding main operation buttons and are arranged to be illuminated and displayed in lower brightness.

Figure 3:
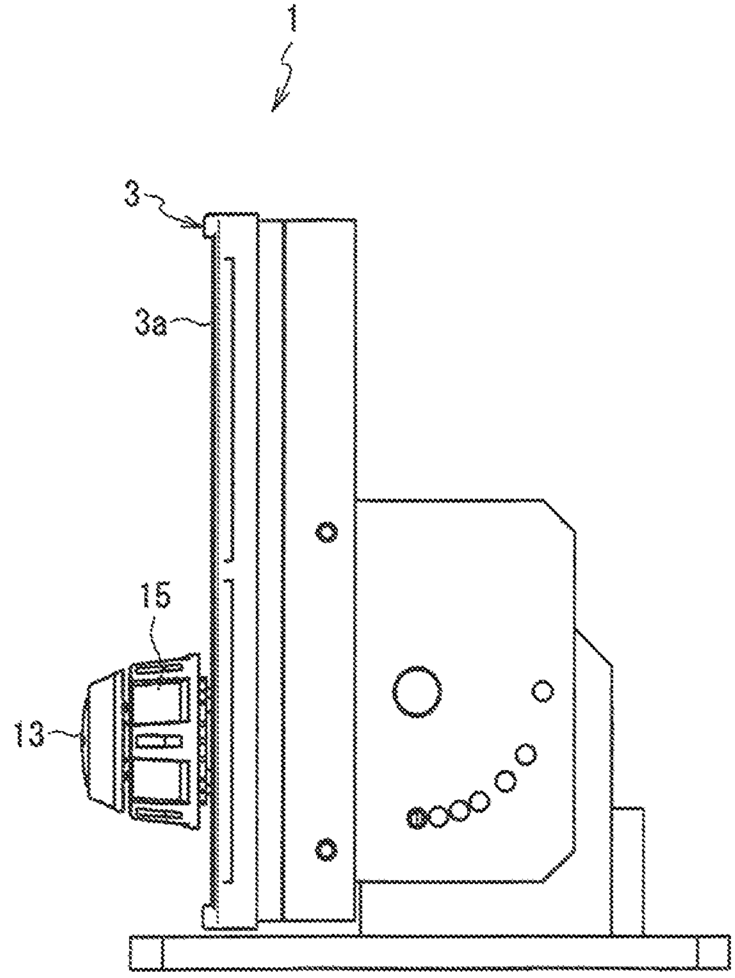
FIG. 3 is a right side view of the touch-operating input device.
Figure 4:
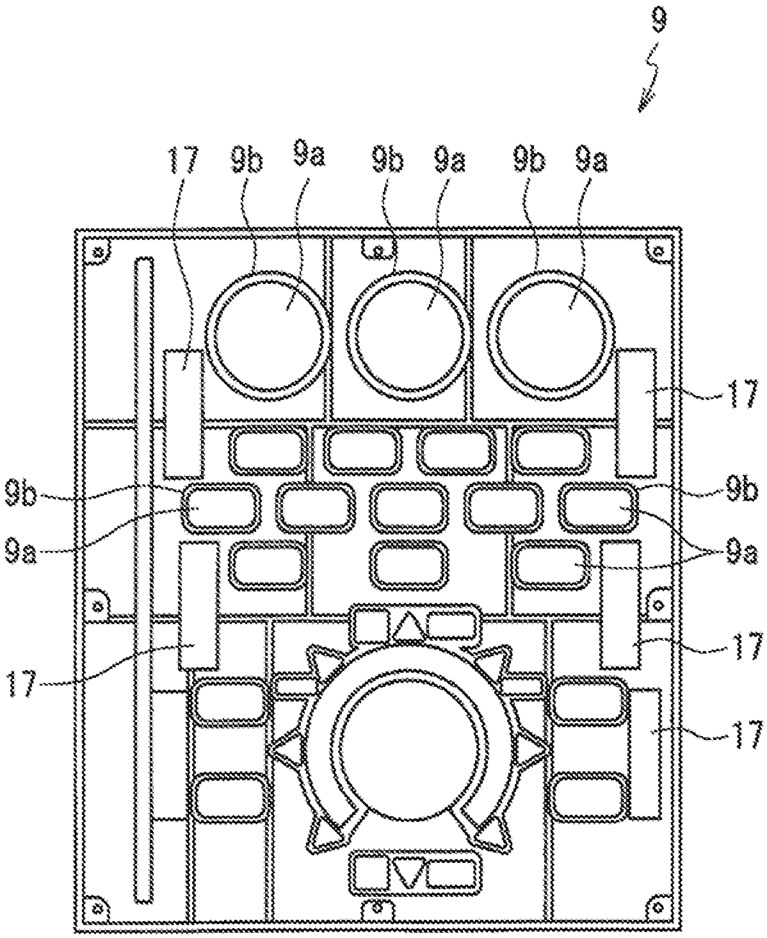
FIG. 4 is a rear view of a light-shielding panel.

The operation lever 13 is provided in a manner to protrude from the touch surface 3*a* of the operation panel 3 (see FIGS. 2 and 3). The operation lever 13 according to the present embodiment is arranged to switch between strong power and weak power of an air conditioner fan by operating the operation lever 13 up and down. This means that the operation lever 13 has a function of supplementing the sub-operation buttons 31*a* to 31*f*. The operation dial 15 is rotatably fitted around the operation lever 13. In the present embodiment, the operation dial 15 has a function of setting a temperature of the air conditioner. The operation lever 13 or the operation dial 15 may have functions other than the foregoing and may be used to supplement or substitute the functions of the main operation buttons or the sub-operation buttons.

(Control Circuit)

Figure 6:
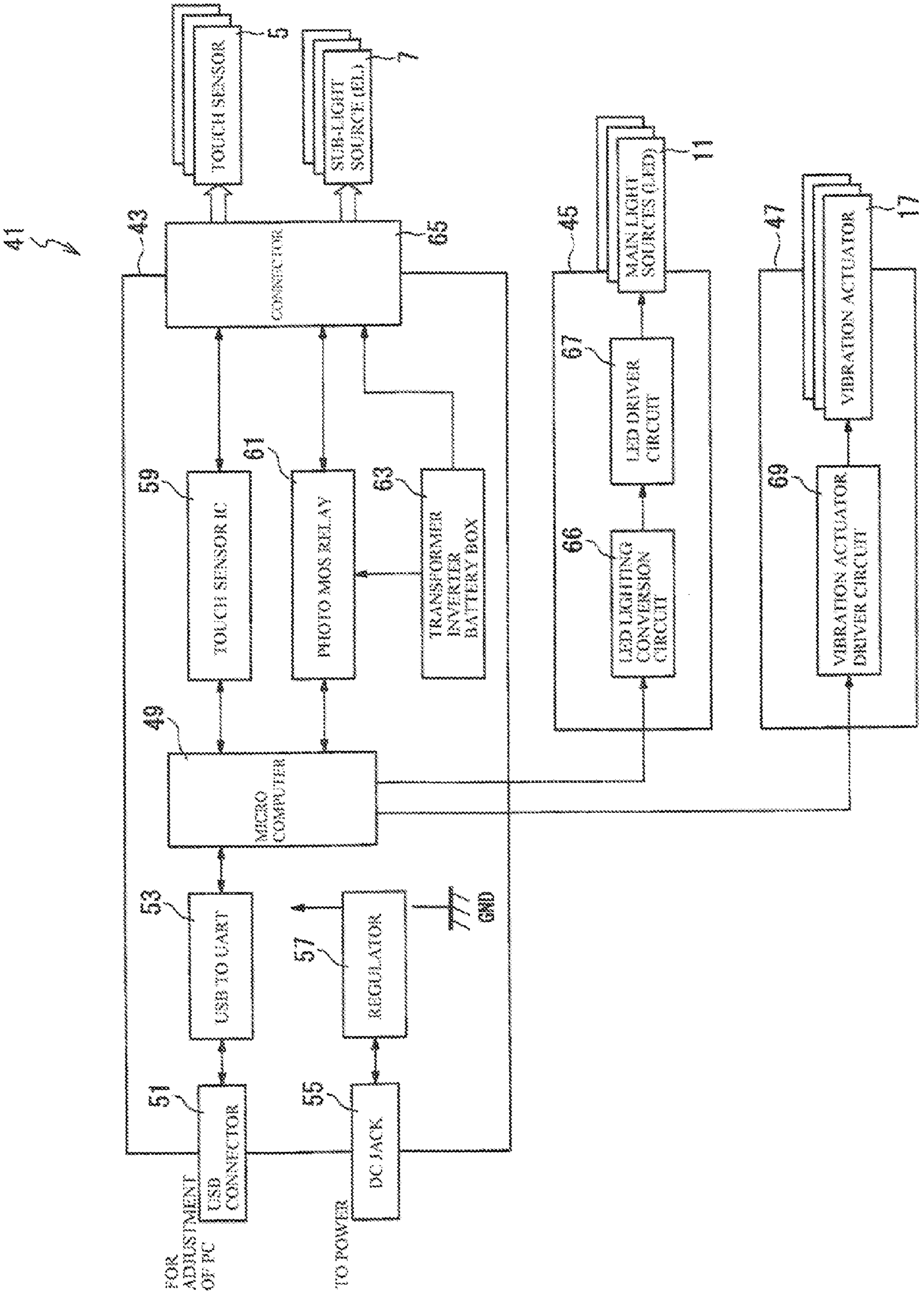
FIG. 6 is a block diagram of a control circuit.

With reference to FIG. 6, the control circuit 41 mounted on the circuit board 19 will be described. The control circuit 41 is a circuit for mainly controlling the main light source 11, the sub-light source 7, and the vibration actuators 17. The control circuit 41 is generally configured of an EL control circuit 43 for controlling the sub-light sources 7 (EL), an LED control circuit 45 for controlling the main light sources 11 (LED), and a vibration actuator circuit 47 for controlling the vibration actuators 17.

The EL control circuit 43 includes therein, as a principal component, a microcomputer 49 for controlling an entire operation. Although individual illustrations are omitted, the microcomputer 49 is an electronic component provided therein with a CPU (Central Processing Unit) for performing control and calculation, a ROM (Read Only Memory) for performing a memory function, a RAM (Random Access Memory), and an I/O port for performing input and output operation. The microcomputer 49 stores a program for controlling the sub-light sources 7, the main light sources 11, and the vibration actuators 17 in the ROM. The CPU reads a program from the ROM and executes the program. While doing so, the CPU assigns a work area for control and calculation in the RAM.

The EL control circuit 43 is provided with a USB connector 51 for connecting a personal computer (not illustrated) for adjustment to the microcomputer 49, and a conversion IC 53 for converting USB signals into UART signals, and is further configured to supply power input through a DC jack 55 to individual portions via a regulator 57. Further, a touch sensor IC 59, a photo MOS relay 61, and a transformer inverter battery box 63 are connected to the microcomputer 49, and these three are connected to the individual touch sensors 5 and sub-light sources 7 (EL) via a connector 65. The touch sensor IC 59 constitutes a part of the touch sensors 5. The photo MOS relay 61 is a relay, for supplying power, through which the transformer inverter battery box 63 is connected to the one to be lit among the plurality of sub-light sources 7.

The LED control circuit 45 includes an LED lighting conversion circuit 66 and an LED driver circuit 67 provided therein, and is configured so that the microcomputer 49, through these circuits, performs control of lighting and extinguishing the main light sources (LED) 11. The vibration actuators 17 are controlled through a vibration actuator driver circuit 69 provided in the vibration actuator circuit 47.

(Operation of Touch-Operating Input Device)

The operation of the touch-operating input device 1 will be described. The control circuit 41 of the touch-operating input device 1 according to the present embodiment is configured such that, when the main light sources individually corresponding to the translucent operation buttons that are operable are lit, the control circuit 41 turns on the sub-light sources corresponding to the translucent operation buttons on condition that the translucent operation button corresponding to the main light source that is lit has been operated.

Alternatively, it is also possible to configure such that, when the main light sources individually corresponding to the translucent operation buttons that are operable are lit, the control circuit 41 turns off the sub-light sources that correspond to the translucent operation buttons and that have been turned on simultaneously with the main light sources on condition that the translucent operation button corresponding to the main light source that is lit has been operated. Hereinafter, the operation will be described in further details.

Figures 7A, 7B, 7C:
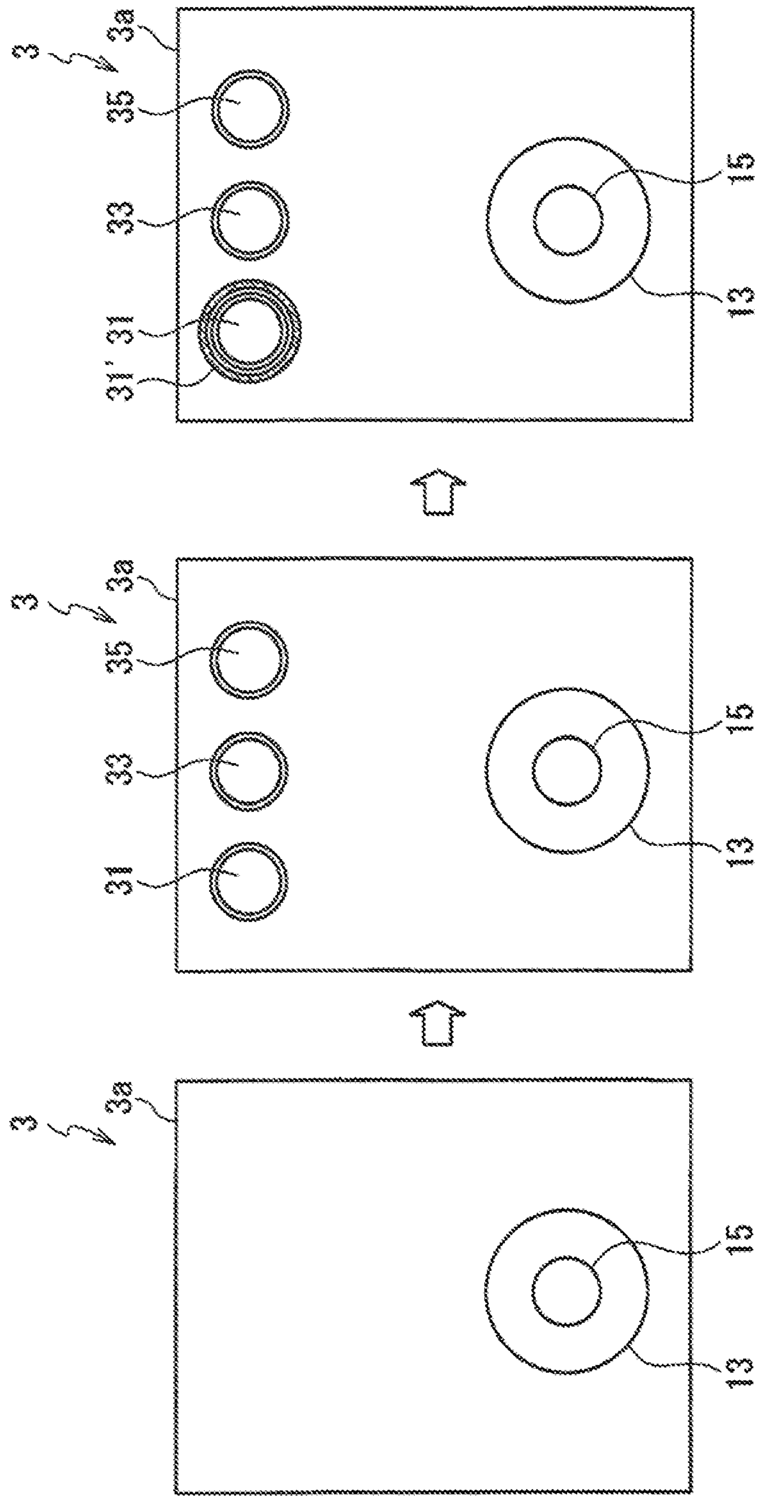
FIG. 7 is a schematic diagram illustrating one example of operation of the touch-operating input device 1.

FIG. 7 is a schematic diagram illustrating one example of operation of the touch-operating input device. In FIG. 7, what are schematically illustrated are the views of the touch-operating input device 1 viewed from a side of the touch surface 3*a* of the operation panel 3 (the same is also applied to FIGS. 8 and 9 that will be described later). For example, when the power of the touch-operating input device 1 is off, in a standby mode, or the like, as illustrated in FIG. 7(A), neither the main operation buttons nor the sub-operation buttons are in a state of being illuminated and displayed.

To be more specific, a control signal is fed to each of the photo MOS relay 61 and the LED lighting conversion circuit 66 by the microcomputer 49 of the control circuit 41 so that all of the main light sources 11 and the sub-light sources 7 are controlled to be turned off (the same is also applied hereinafter). However, if the touch-operating input device 1 is used as an in-vehicle input device, it is preferable that the power be turned on or off in an interlocking manner with, for example, an ignition switch. In this state, as illustrated, the touch-operating input device 1 is in a state in which mainly the operation lever 13 and the operation dial 15 are visible.

In this state, when the power to the touch-operating input device 1 is turned on, or contact with the touch surface 3*a* of the operation panel 3 by a finger of the operator etc. is detected by the touch sensor 5 and the touch sensor IC 59, the microcomputer 49 of the control circuit 41 controls the main light sources 11 corresponding to the main operation buttons 31, 33, and 35, which are the translucent operation buttons that can be operated, to be in a lit state.

As illustrated in FIG. 7(B), with this arrangement, each of the main operation buttons 31, 33, and 35 is turned into a state of being, illuminated and displayed. In this state, if any of the main operation buttons (for example, the main operation button 31) is operated, this serving as a condition, the microcomputer 49 of the control circuit 41 controls the sub-light source 7 corresponding to the main operation button to be in a lit state. As a result, as illustrated in FIG. 7(C), the translucent outer portion 31' corresponding to the main operation button 31 turns into a state of being illuminated and displayed.

Through the foregoing operation, the operator can securely distinguish the operation buttons that can be used at a certain moment (the main operation button 31, etc. in this example) and the operation buttons that cannot be used at that moment (the sub-operation buttons in this example) from each other. At the same time, it is possible to see the operation button (the main operation button 31 in the above-mentioned example) that has been operated by the operator by turning on or off the translucent outer portion corresponding to each operation button.

Figure 8C:
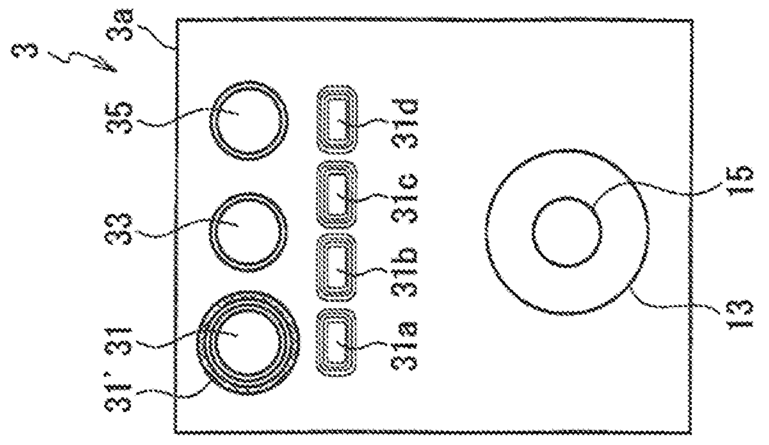
FIG. 8 is a schematic diagram illustrating another example of operation of the touch-operating input device 1.
Figure 8B:
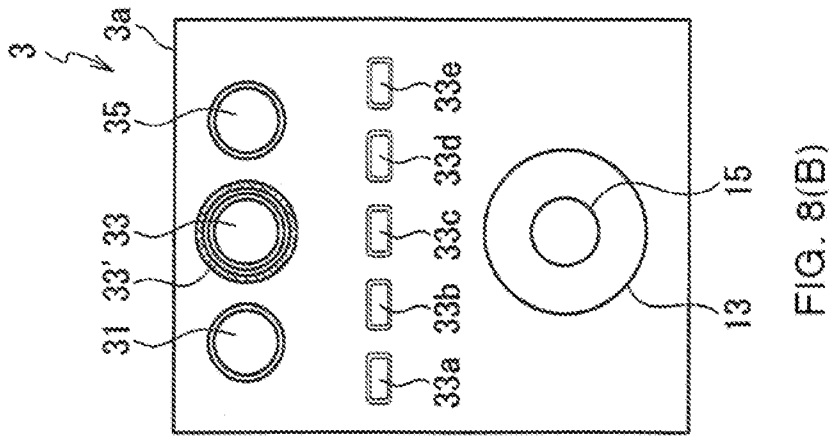
Figure 8A:
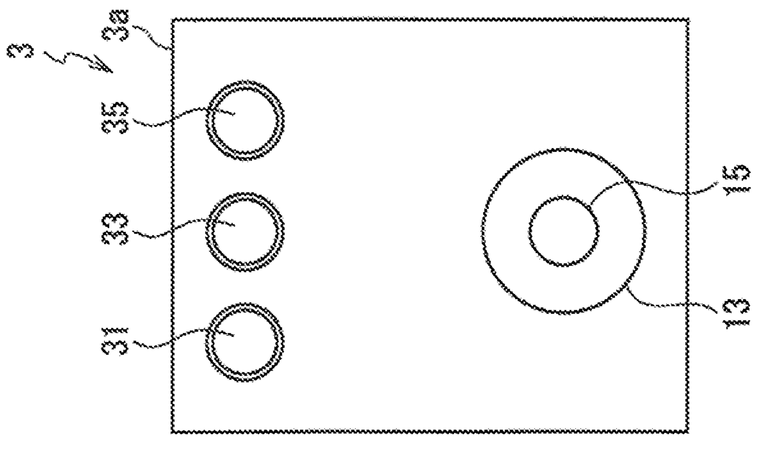

FIG. 8 is a schematic diagram illustrating another example of operation of the touch-operating input device 1. If any of the main operation buttons is operated when all of the main light sources 11 relating to the plurality of main operation buttons 31, 33, and 35 are in an extinguished state, the microcomputer 49 of the control circuit 41 controls all of the main light sources 11 to turn on. As a result, as illustrated in FIG. 8(A), each of the main operation buttons 31, 33, and 35 turns into a state of illuminated and displayed.

Subsequently, the microcomputer 49 of the control circuit 41 controls all of the main light sources 11 relating to the sub-operation buttons (the sub-operation buttons 33*a*, 33*b*, 33*c*, 33*d*, and 33*e* in this example) corresponding to the main operation button (the main operation button 33 in this example) that has been operated earlier by the operator to turn on. As a result, as illustrated in FIG. 8(B), each of the sub-operation buttons 33*a* to 33*e* turns to be a state of being illuminated and displayed.

In addition, in this example, the sub-light sources 7 relating to the main operation button 33 that has been operated earlier are controlled to be a lit state as in the case of the operation example described with reference to FIG. 7. With this arrangement, as illustrated in FIG. 8(B), the translucent outer portion 33' corresponding to the main operation button 33 turns into a state of being illuminated and displayed.

On the other hand, when the main operation button (for example, the main operation button 31) other than the main operation button 33 that has been operated earlier, is operated later, the microcomputer 49 of the control circuit 41 controls all of the main light sources 11 relating to the sub-operation buttons (sub-operation buttons 31*a* to 31*d* in this example) that relate to the later operation to be in a lit state, and controls all of the main light sources 11 relating to the sub-operation buttons (sub-operation buttons 33*a* to 33*e* in this example) relating to the earlier operation to be in an extinguished state.

Through this process, as illustrated in FIG. 8(C), each of the sub-operation buttons 33*a* to 33*e* is not illuminated and displayed, and each of the sub-operation buttons 31*a* to 31*d* is in a state of being illuminated and displayed. Further, in this example, the sub-light sources 7 relating to the main operation button 31 that has been operated later are controlled to be in an illuminated state as in the case of the example of operation described with reference to FIG. 7.

As a result, as illustrated in FIG. 8(C), the translucent outer portion 31' corresponding to the main operation button 31 is illuminated and displayed.

Through the foregoing operation, when any of the main operation buttons is operated while all of the main operation buttons are not illuminated and displayed, all of the main operation buttons are illuminated and displayed. All of the sub-operation buttons corresponding to the main operation button that has been operated among all of the main operation buttons that are illuminated and displayed are illuminated and displayed. Here, when the operation button other than the one that has been operated earlier is operated (later operation), all of the sub-operation buttons relating to the main operation button that has been operated earlier cease to be illuminated and displayed, and all of the sub-operation buttons relating to the main operation button that is operated later are illuminated and displayed.

In the operation example illustrated in FIG. 8, it is also possible to configure such that the control circuit 41 stops illuminating and displaying the sub-operation buttons and the main operation buttons that are illuminated and displayed on condition that the main operation button relating to the sub-operation button that is illuminated and displayed is operated again. With this arrangement, when the main operation button (the sub-operation buttons corresponding to the main operation buttons other than this are not illuminated and displayed) corresponding to the sub-operation button that is illuminated and displayed is operated again, all of the main operation buttons and the sub-operation buttons cease to be illuminated and displayed.

As a result, all of the operation buttons are turned into a state of unilluminated and nondisplayed (see FIG. 7(A)), and the surface of the touch panel becomes neat. Unnecessary illumination and display are excluded, and this makes the design of the surface of the touch panel neat and clean.

Figures 9A, 9B, 9C:
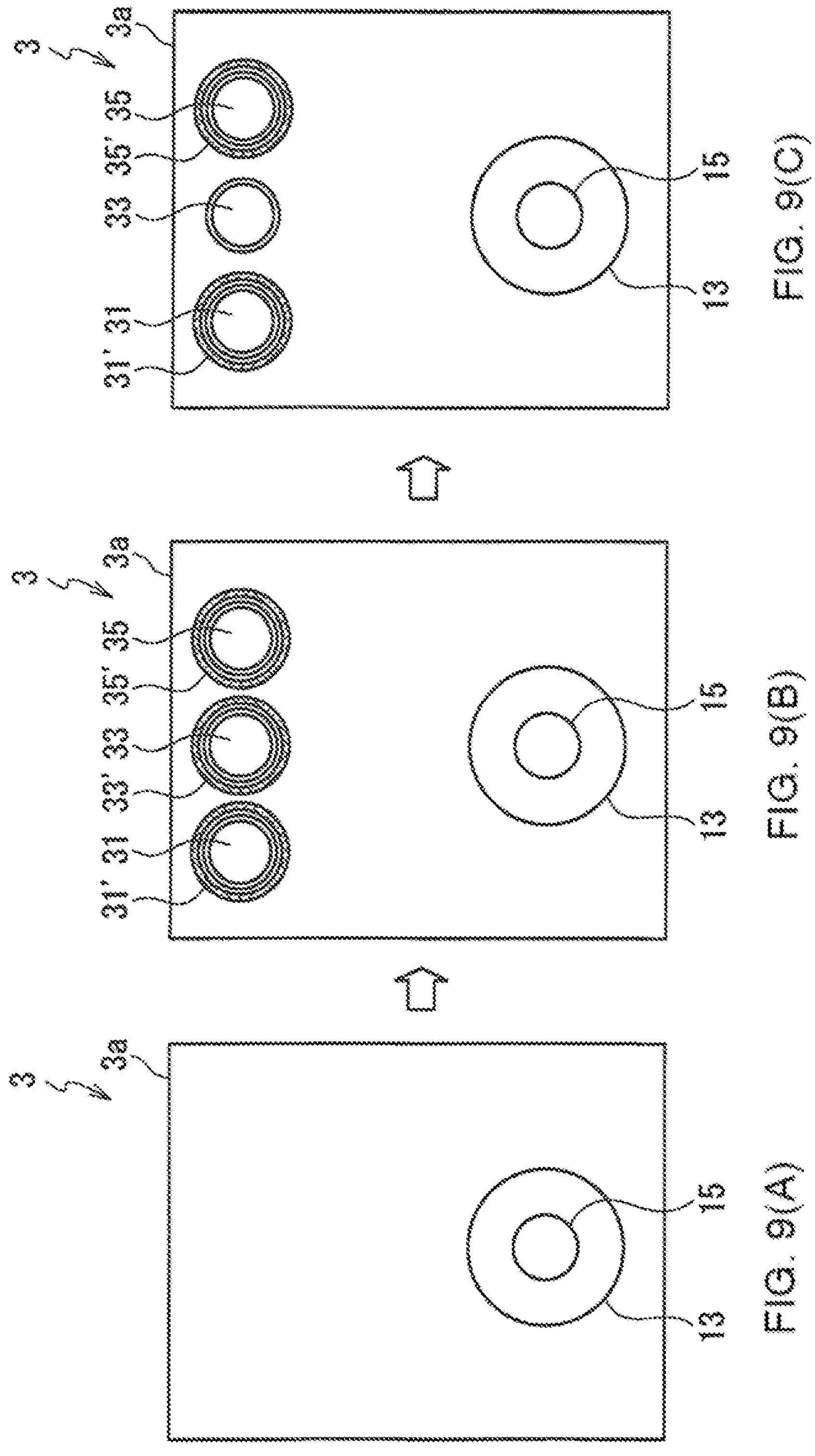
FIG. 9 is a schematic diagram illustrating another example of operation of the touch-operating input device 1.

FIG. 9 is a schematic diagram illustrating another example of operation of the touch-operating input device 1. In the operation example described with reference to FIG. 7, when the power of the touch-operating input device 1 is turned on, each of the main operation buttons 31, 33, and 35 is turned into a state of being illuminated and displayed. Subsequently, when any of the main operation buttons is operated, the translucent outer portion corresponding to the operated main operation button is controlled to be illuminated and displayed. However, this display control may be reversed. In that case, as illustrated in FIG. 9, the microcomputer 49 of the control circuit 41 controls, from an initial state (FIG. 9(A)), each of the main operation buttons 31, 33, and 35 and all of the translucent outer portions 31', 33' and 35' corresponding thereto to be in a displayed state (FIG. 9(B)) according to the condition such as power-on of the touch-operating input device 1.

Thereafter, when any of the main operation buttons (the main operation button 33 in this example) is operated, only the translucent outer portion (the translucent outer portion 33', in this example) corresponding to the main operation button is controlled into a nondisplayed state. The specific control by the microcomputer 49 is as described above.

Further, in addition to each operation described above, it is also possible to provide vibration means that applies vibrations to a finger that performs touch operation or notification means that sounds a touch sound when any of the main operation buttons or the sub-operation buttons is touched and operated. Hereinafter, such operation will be described.

Figure 10:
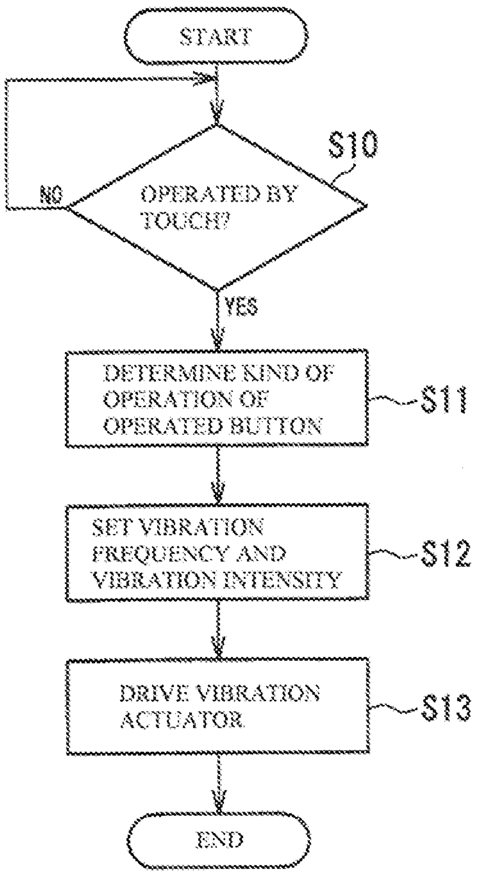
FIG. 10 is a flowchart depicting a control flow when vibrations are applied to a touching finger.

FIG. 10 is a flowchart depicting a control flow when vibrations are applied to a touching finger. The control described here is performed together with the illumination control described above. Specifically, the microcomputer 49 of the control circuit 41 determines whether or not touch operation is performed on the touch surface 3*a* of the operation panel 3 by a finger or the like of the operator. If there is no touch operation (No in step S10), the microcomputer 49 falls into a standby state.

On the other hand, if touch operation is performed (Yes in step S10), the microcomputer 49 of the control circuit 41 determines a kind of operation (step S11) and sets a vibration frequency and a vibration intensity according to the kind of operation (step S12). Thereafter, the microcomputer 49 of the control circuit 41 feeds a control signal that corresponds to the vibration frequency and the vibration intensity thus set to the vibration actuator driver circuit 69. With this arrangement, a drive signal is fed to the vibration actuator 17 from the vibration actuator drive circuit 69, and the vibration actuator 17 is driven at the vibration frequency and the vibration intensity that are set in step S12 (step S13).

According to this operation example, confirmation of the touch operation can be performed in a tactile or acoustic manner or in a tactile and acoustic manner in addition to the visual manner. In the foregoing operation example, the vibration frequency and the vibration intensity are variably set according to the kind of operation. However, only one of the vibration frequency and the vibration intensity may be variably set, or the vibration frequency and the vibration intensity may be fixedly set regardless of the kind of operation.

Figure 11:
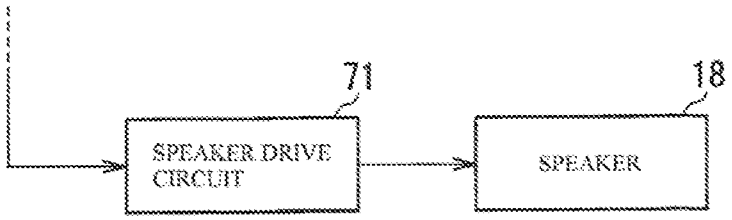
FIG. 11 is a block diagram illustrating one example of a configuration for generating a touch sound.

FIG. 11 is a block diagram illustrating one example of a configuration for generating a touch sound. The notification means illustrated in FIG. 11 is provided with a drive circuit 71 that receives a control signal from the microcomputer 49 and drives a speaker, and a speaker 18 connected to the drive circuit 71. With addition of such a notification means to the foregoing touch-operating input device 1, it is possible to generate a touch sound in accordance with the operation by the operator. Hereinafter, the operation will be described.

Figure 12:
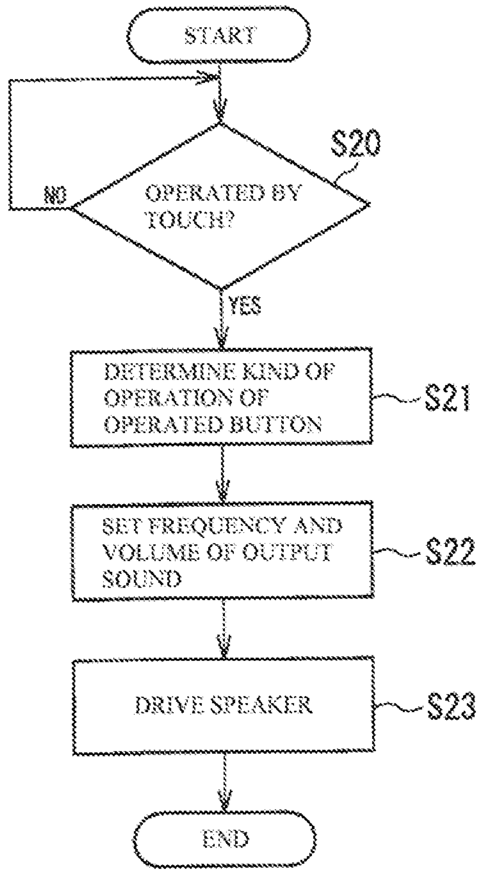
FIG. 12 is a flowchart depicting a control flow when a touch sound is generated.

FIG. 12 is a flowchart depicting a control flow when a touch sound is generated. The control described here is performed together with the illumination control or the vibration control described before. Specifically, the microcomputer 49 of the control circuit 41 determines whether or not touch operation is performed on the touch surface 3*a* of the operation panel 3 by a finger or the like of the operator. If there is no touch operation (No in step S20), the microcomputer 49 falls into a standby state. On the other hand, if touch operation is performed (Yes in step S20), the microcomputer 49 of the control circuit 41 determines a kind of operation (step S21) and sets a frequency and a volume of output sound according to the kind of operation (step S22).

Thereafter, the microcomputer 49 of the control circuit 41 feeds a control signal that corresponds to the frequency and volume of output sound thus set to the speaker drive circuit 71. With this arrangement, a drive signal is fed to the speaker 18 from the speaker drive circuit 71, and the speaker 18 is driven (step S23). This means that sound having the frequency and volume set in step S12 is produced from the speaker 18. Here, if the vibration means and the notification means are both added, the processes in steps S20 and S21 can be organized in common with the foregoing steps S10 and S11.

According to this operation example, identification of an operation button that is operated can be easily performed by a difference in the sound frequency or volume. In the foregoing operation example, the sound frequency and volume are variably set according to the kind of operation. However, only one of them may be variably set, or the vibration frequency and the vibration intensity may be fixedly set regardless of the kind of operation.

Although a typical embodiment of the present invention has been described above, the scope of the invention to be applied is not limited to the embodiment, and various changes could be made hereto without departing from the spirit of the invention.

EXPLANATION OF REFERENCE NUMERALS

1 Touch-operating input device
3 Touch panel
3*a* Touch surface
5 Touch sensor
7 Sub-light source
9 Light-shielding panel
11 Main light source
13 Operation lever
15 Operation dial
17 Vibration actuator
31, 33, 35, Main operation buttons
31', 33', 35' Translucent outer portions of main operation buttons
31*a* to 31*f*, 33*a* to 33*e* and 35*a* to 35*e* Sub-operation buttons
31'*a* to 31'*f*, 33'*a* to 33'*e*, and 35'*a* to 35'*e* Translucent outer portions of sub-operation buttons
41 Control circuit Alternative combinations and variations of the examples provided will become apparent based on this disclosure. It is not possible to provide specific examples for all of the many possible combinations and variations of the embodiments described, but such combinations and variations may be included in claims that eventually issue.

The invention claimed is:

1. A touch-operating input device comprising:

a) an operation panel including a touch surface and a rear surface opposite to the touch surface;

b) a plurality of translucent touch sensors disposed on the rear surface of the operation panel;

c) a plurality of sub-light sources disposed in a position facing the operation panel with the plurality of translucent touch sensors interposed therebetween;

d) a light-shielding panel disposed in a position opposite to the plurality of translucent touch sensors with respect to the plurality of sub-light sources;

e) a plurality of main light sources disposed in a predetermined position facing the plurality of sub-light sources with the light-shielding panel interposed therebetween; and f) a control circuit configured to perform control of lighting and extinguishing the sub-light sources and the main light sources;

wherein a plurality of translucent operation buttons individually corresponding to the plurality of translucent touch sensors, and translucent outer portions formed individually in outer portions of the plurality of translucent operation buttons are formed on the rear surface of the operation panel by concealed printing such that the operation buttons and the translucent outer portions are illuminated and displayed only when the main light sources and the sub-light sources are lit, the light-shielding panel is provided with a plurality of non-light-shielding regions individually corresponding to the plurality of translucent touch sensors;

light of each of the plurality of main light sources that are lit is configured to pass through the non-light-shielding region and the translucent touch sensor so that only the translucent operation button corresponding to each of the plurality of main light sources is illuminated and displayed;

light of each of the plurality of sub-light sources that are lit is configured to pass through the translucent touch sensor so that only the translucent outer portion corresponding to each of the plurality of sub-light sources is illuminated and displayed, and when the control circuit turns on the main light source corresponding to each of the translucent operation buttons that can be operated, the control circuit, on condition that the translucent operation button corresponding to the main light source that is turned on is operated, turns on the sub-light source corresponding to the translucent operation button that is operated.

2. A touch-operating input device comprising:

a) an operation panel including a touch surface and a rear surface opposite to the touch surface;

b) a plurality of translucent touch sensors disposed on the rear surface of the operation panel;

c) a plurality of sub-light sources disposed in a position facing the operation panel with the plurality of translucent touch sensors interposed therebetween;

d) a light-shielding panel disposed in a position opposite to the plurality of translucent touch sensors with respect to the plurality of sub-light sources;

e) a plurality of main light sources disposed in a predetermined position facing the plurality of sub-light sources with the light-shielding panel interposed therebetween; and f) a control circuit configured to perform control of lighting and extinguishing the sub-light sources and the main light sources;

wherein a plurality of translucent operation buttons individually corresponding to the plurality of translucent touch sensors, and translucent outer portions formed individually in outer portions of the plurality of translucent operation buttons are formed on the rear surface of the operation panel by concealed printing such that the translucent operation buttons and the translucent outer portions are illuminated and displayed only when the light sources are lit; the light-shielding panel is provided with a plurality of non-light-shielding regions individually corresponding to the plurality of translucent touch sensors;

light of each of the plurality of main light sources that is lit is configured to pass through the plurality of non-light-shielding regions and the translucent touch sensor so that only the translucent operation button corresponding to each of the plurality of main light sources is illuminated and displayed;

light of each of the plurality of sub-light sources that are lit is configured to pass through the translucent touch sensor so that only the translucent outer portion corresponding to each of the plurality of sub-light sources is illuminated and displayed; and when the control circuit turns on the main light source corresponding to each of the translucent operation buttons that can be operated, the control circuit, on condition that the translucent operation button corresponding to the main light source that is turned on is operated, turns off the sub-light source corresponding to the translucent operation button that is turned on simultaneously with the main light source.

3. The touch-operating input device according to claim 1, wherein the light-shielding panel is provided with light-shielding ribs having a cylindrical shape and formed upright on individual peripheries of the non-light-shielding regions; and the main light source is disposed inside the cylindrical shape of each of the light-shielding ribs.

4. The touch-operating input device according to claim 1, wherein brightness of the plurality of translucent operation buttons and brightness of the translucent outer portions individually corresponding thereto are different from each other.

5. The touch-operating input device according to claim 1, wherein the translucent operation buttons are configured of a plurality of main operation buttons, and a plurality of sub-operation buttons that are provided in a manner to correspond to individual functions of the plurality of main operation buttons.

6. The touch-operating input device according to claim 5, wherein each of the plurality of sub-operation buttons has a display area smaller than a display area of each of the plurality of main operation buttons corresponding thereto.

7. The touch-operating input device according to claim 5, wherein the main light sources are configured by including LEDs, and the sub-light sources are configured by including ELs or organic ELs.

8. The touch-operating input device according to claim 5, wherein each of the main light sources is configured to illuminate and display the plurality of main operation buttons in colors different from one another.

9. The touch-operating input device according to claim 8, wherein the sub-light sources are configured to illuminate and display the sub-operation buttons in colors individually similar to the colors in which corresponding main operation buttons are illuminated and displayed.

10. The touch-operating input device according to claim 5, wherein while the main light sources relating to the plurality of main operation buttons are all turned off, the control circuit turns on all of the main light sources on condition that any of the main operation buttons is operated, and at the same time, the control circuit turns on all of the main light sources that relate to the sub-operation buttons corresponding to the main operation button that has been operated earlier after all of the main light sources are turned on, and when another main operation button other than that operated earlier is operated later, the control circuit turns on all of the main light sources relating to the sub-operation buttons that relate to the later operation and turns off all the sub-light sources relating to the sub-operation buttons that relate to the earlier operation.

11. The touch-operating input device according to claim 10, wherein the control circuit is configured to stop illuminating and displaying the sub-operation buttons and the main operation buttons that are all illuminated and displayed on condition that the main operation button relating to the sub-operation button which has been illuminated and displayed is operated again.

12. The touch-operating input device according to claim 10, wherein each of the main light sources is configured to illuminate and display the plurality of main operation buttons individually in colors different from one another.

13. The touch-operating input device according to claim 12, wherein each of the sub-light sources is configured to illuminate and display the sub-operation buttons individually in colors similar to those of the main operation buttons corresponding thereto.

14. The touch-operating input device according to claim 5, wherein the operation panel is provided, on the touch surface thereof, with one or both of an operation lever and an operation dial that serve functions supplementing or substituting functions of the main operation buttons or the sub-operation buttons.

15. The touch-operating input device according to claim 5, wherein one or both of a vibration means and a notification means are provided so that, when any of the main operation buttons or the sub-operation buttons is operated by touch of a finger, the vibration means applies vibration to the finger, or the notification means generates a touch sound.

16. The touch-operating input device according to claim 15, wherein a vibration frequency of the vibration means or a frequency of the touch sound of the notification means is set differently for each of the operation buttons.

17. The touch-operating input device according to claim 13, wherein the touch-operating input device is configured as an in-vehicle type and the main operation button is configured to selectively operate in-vehicle apparatuses including an air conditioner, an audiovisual device, and a car navigation device.

18. An electronic device comprising the touch-operating input device according to claim 1.

19. An electronic device comprising the touch-operating input device according to claim 2.

* * * * *